(12) United States Patent
Edwards et al.

(10) Patent No.: US 6,519,086 B2
(45) Date of Patent: Feb. 11, 2003

(54) IMAGE MAINTENANCE SHIELD

(76) Inventors: Paul R. Edwards, 1123 N. Marion St., Oak Park, IL (US) 60302; John M. Edwards, 2400 Winfield La., Belvedere, IL (US) 61008

( * ) Notice: Subject to any disclaimer, the term of this patent is extended or adjusted under 35 U.S.C. 154(b) by 0 days.

(21) Appl. No.: 09/726,709

(22) Filed: Nov. 30, 2000

(65) Prior Publication Data
US 2002/0063956 A1 May 30, 2002

(51) Int. Cl.⁷ .............. G03B 21/56; G02B 27/00; H04N 5/64
(52) U.S. Cl. .............. 359/450; 359/601; 348/842
(58) Field of Search .............. 359/450, 461, 359/601, 449; 348/834, 842; 396/1, 3

(56) References Cited

U.S. PATENT DOCUMENTS

| | | | |
|---|---|---|---|
| 1,208,462 A | 12/1916 | Boernstein | 359/450 |
| 1,460,600 A | 7/1923 | Palmer | 359/450 |
| 3,695,746 A | 10/1972 | Youngblood | 359/450 |
| 3,868,961 A | 3/1975 | Sternis | 135/145 |
| 3,918,810 A | 11/1975 | Cohen | 355/18 |
| 5,200,859 A | 4/1993 | Payner et al. | 359/857 |
| 5,235,368 A * | 8/1993 | Oglesbee | 396/3 |
| 5,373,422 A * | 12/1994 | Hodkinson | 396/3 |
| 5,418,642 A | 5/1995 | Bende | 359/450 |
| 5,434,631 A | 7/1995 | Lieberman et al. | 353/119 |
| 5,510,862 A | 4/1996 | Lieberman et al. | 353/119 |
| 5,523,880 A | 6/1996 | Pidgeon et al. | 359/450 |
| 5,798,861 A * | 8/1998 | Doat | 359/461 |
| 5,953,542 A * | 9/1999 | Fleming | 396/3 |
| 6,052,227 A * | 4/2000 | Niwa | 359/461 |
| 6,419,367 B1 * | 7/2002 | Dion et al. | 359/601 |

* cited by examiner

*Primary Examiner*—Christopher Mahoney
(74) *Attorney, Agent, or Firm*—Baniak Pine & Gannon

(57) ABSTRACT

A configurable shield and methods related to same by which the ambient light in conventionally illuminated venues can be largely prevented from falling onto or around a screen such that images displayed on the screen are generally not degraded in quality. The configurable shield includes shield components that are preferably of a durable, yet light weight construction such that the components can be easily transported, assembled, and moved into position for use, then disassembled by one or a few individuals. The shield components include a shielding element—of a composition and having a construction such that the shield is generally non-translucent to light—and a sizable positioning element that provides additional structure to the shielding element and allows it, and thereby the entire shield to be positioned in a wide variety of configurations as needed such that the shielding element can be positioned adjacent to or in contact with the screen so that ambient light can be generally blocked from falling onto the viewing surface.

3 Claims, 12 Drawing Sheets

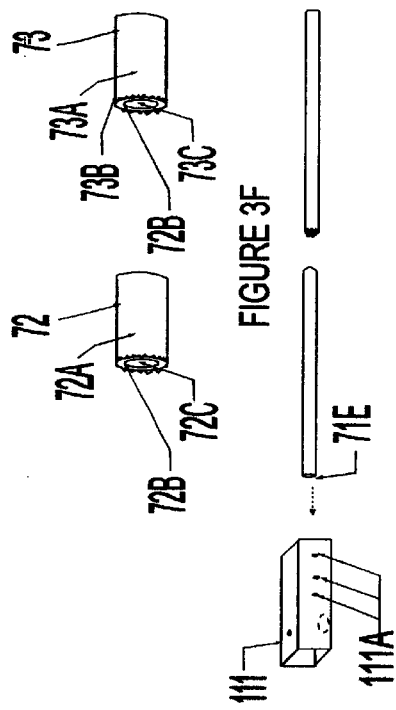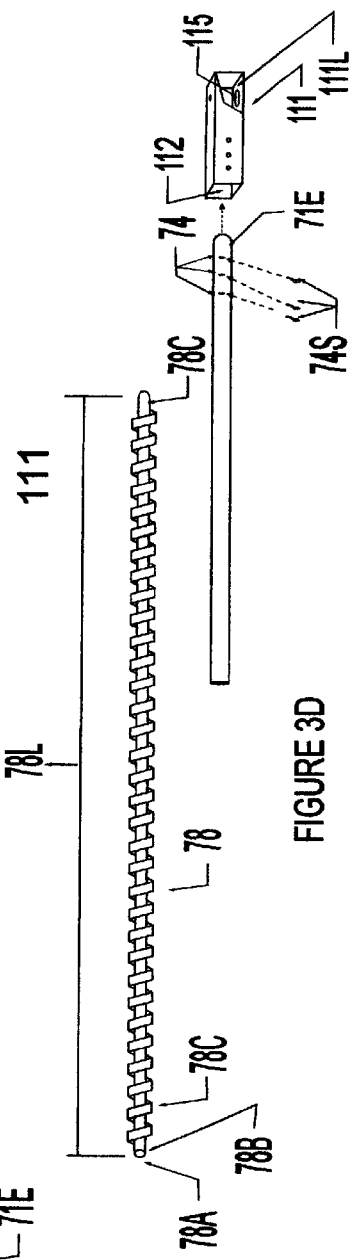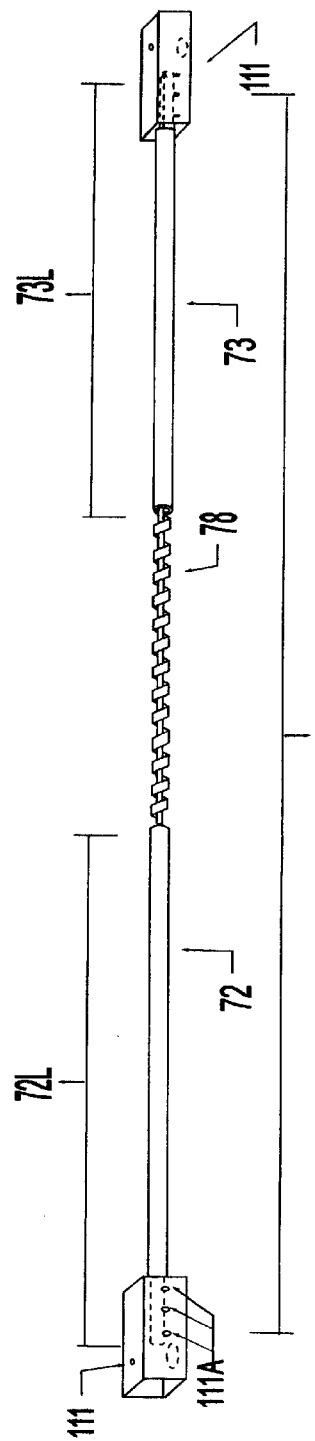
FIGURE 3F
FIGURE 3D
FIGURE 3E

IMAGE MAINTENANCE SHIELD

FIELD OF THE INVENTION

The present invention generally relates to apparatus and methods to prevent the alteration or degradation of images displayed on a screen. More particularly, the invention relates to apparatus including material and of a construction by which the light overhead or surrounding screens of various dimensions and positions can be largely prevented from falling onto or around the screen thereby lessening the alteration or degradation of the displayed image. Advantageously, the present invention is useful in allowing such images to be viewed even in venues that remain conventionally illuminated.

BACKGROUND OF THE INVENTION

A variety of devices and systems are known for the development, production, or displaying images on a surface for their viewing. One such system utilizes a projector to "throw" or project information from slides, a length of film, tape, or another source onto a screen such that an image is visible thereon. The screen may be self supporting or wall mounted. Another system is generally more self-contained and does not require that the projector be spaced apart from the receiving screen as do embodiments of the previously described system in order to focus and size the image on the screen. An example of this other generally more self-contained system is a television that receives information and develops an image of a general uniform size on a screen. The number of people that can collectively view the image created by any of these systems is largely a function of the size of the image on the screen. A large screen can receive large projected images so that a large audience may view them simultaneously. Even large screen television monitors typically produce a relatively smaller image that can be viewed only by a generally smaller audience simultaneously. In the following, the term "screen" will mean any surface on which an image is displayed for viewing including self-supporting and wall mounted opaque flat surfaces onto which images are projected such as from a projector and the surfaces within, for example, monitors or television sets on which a generally uniform sized image is generated for viewing and include opposing upper and lower boundaries and side boundaries.

The contrast and clarity of the image produced on the screen often depends on a variety of factors including the amount of light striking the viewing surface from sources that are overhead and to the side. For purposes of this application, light—whether from overhead, side, or other sources—that may, if unimpeded, strike the viewing surface, will be termed "ambient light". The greater the intensity of the ambient light, generally the less distinguishable and more "washed out" the image display is.

Some indoor venues—particularly new or refurbished buildings or rooms or halls—feature individual or group control systems by which the amount of ambient light such as from overhead sources can be adjusted individually or as a group so that the amount of light being cast in or about a screen can be reduced thereby preventing the degradation of the displayed image.

However, the larger number of indoor venues do not offer such controls. Projector/screen combinations are typically set up in or at these venues on an ad hoc basis for one or more presentations and then removed. To prevent the degradation of the displayed image, a large part or all of the interior space must be darkened.

Darkening a large part or all of an interior space in order that an audience may view a projected image is generally not preferred for many reasons. Low or little light is hazardous to those attempting to enter the blackened room from a lighted area. To avoid stumbling and accidents, those attempting to join the audience typically are forced to remain at or very near the entrance while their eyes adjust to the low light conditions. However, individuals remaining at or near the entrance prevent others from easily entering and others from departing the area. The darkened conditions can also create distractions such as to the audience members and speaker. Each time someone opens a door to join or depart from the audience, light streams into the darkened area from the exterior space thereby disrupting the audience or speaker and possibly requiring the individuals already in the darkened space to wait until their eyes have readjusted to the previous low light conditions. The blackened room also prevents the audience from taking notes or reading handouts or even clearly seeing the speaker or props or models that the speaker wishes to utilize during the presentation.

The blackened room may also prevent the speaker from delivering the presentation as intended or safely. When made available, some speakers utilize a lectern to work from notes or prepared text either in hard copy form or projected onto what is intended to be an inconspicuous teleprompter surface. However, unless the lectern has a working reading light, blackening the room so that the entire audience can see the projected image prevents the speaker from working from the hard copy notes or text positioned on the lectern. Blackening the room prevents also the teleprompter surface from remaining inconspicuous during the presentation. Blackening the room would prevent other speakers that follow and are at a head table from taking notes since such tables typically are not equipped with individual reading lights. The facility also may not be equipped with a lectern having a working reading light or a teleprompter or the speaker may simply choose to remain seated at the head table during the presentation. Blackening the room would prevent the speaker that utilize notes or prepared text from remaining in this position. Other speakers find it more effective to stand or walk about the room to deliver the presentation and work from notes or prepared text. These same speakers may also choose to walk up to the viewing surface to emphasize a point by directing the audiences attention to some aspect of the projected image. A blackened room would prevent the speaker from safely utilizing these presentation techniques especially because it is not uncommon for a room that is temporarily set up for a presentation to have a variety of wires and cables stretched out in the very area in which the speaker must attempt to walk around.

The room in which the presentation is going to be made may be a courtroom. Blackening the room in order that the jury, the judge, the parties and counsel, and the audience may view the projected image may not be desirable given the need to maintain the security in the room.

Other possible venues largely cannot be used to permit a large audience to view a conventionally displayed image during daylight hours because the ambient light cannot be controlled. Typical of such venues are outdoor sales events, fairs, parks, and zoos. Without the ability to control the intensity of the overhead light selectively around the viewing surface, any conventionally displayed image is degraded in clarity.

A demand therefore exists for simplified apparatus and methods by which the amount of ambient light reaching the immediate area around and the surface of a screen can be controlled simply, quickly, and even on an ad hoc or temporary basis both in indoor and in outdoor venues. The present invention satisfies the demand.

SUMMARY OF THE INVENTION

The apparatus of the present invention is a configurable shield. The shield is of a simplified self-contained construction such that the shield can be quickly assembled and disassembled by even those with little training and generally without the need for expensive, heavy, or complicated tools. The shield components are preferably of a durable, yet light weight construction such that the components can be easily transported, assembled, and moved into position for use, then disassembled by one or a few individuals. The shield components may be formed from materials that are inexpensive and disposable or recyclable. The shield components include a shielding element—of a composition and having a construction such that the shield is generally non-translucent to light—and a sizable positioning element that provides additional structure to the shielding element and allows it, and thereby the entire shield to be positioned in a wide variety of configurations as needed such that the shielding element can be positioned adjacent to or in contact with the screen so that ambient light can be generally blocked from falling onto the viewing surface.

The shielding element of certain embodiments of the present invention is generally durable, yet flexible so that the shielding element may be folded, rolled, or compressed into a compact state to facilitate the transportation of the element with other shield components and quickly opened in order to thereby assemble or deploy the shield. A flexible shielding element further advantageously allows the shield when assembled to be generally adjusted to facilitate the use of the shield adjacent to or in contact with screens and viewing surfaces of different sizes, configurations, and positions. A flexible shielding element further advantageously allows the area that is shielded, and thereby darkened to be adjusted to provide shielded areas of varying horizontal depth and vertical height.

The sizable configuring element of certain embodiments of the present invention include a sizable horizontal positioning element and sizable vertical positioning elements. Preferably, the sizable horizontal positioning element and the sizable vertical positioning elements are of a durable, yet light weight construction such that the elements can be easily transported, easily assembled, adjusted, and fit with the other components of the shield so that the shield even when fully assembled can be moved and adjusted as needed.

Certain embodiments of the sizable vertical positioning elements include vertically adjustable lengths such as telescoping lengths that can be quickly and easily be drawn out from or pushed back into and releasably locked relative to each other and having a construction such that the shielding element and the sizable horizontal positioning element can be at least partially supported and the vertical dimensions of the shield to be defined thereby. Embodiments of the sizable vertical positioning elements may include vertical element bases of varying configurations to facilitate the assembly, positioning, adjustment, stablization, disassembly, and/or transport of the shield when disassembled. One embodiment of the vertical element base is generally fixed in dimension but includes means by which the base can be quickly connected to the vertical standard. Another embodiment of the vertical element base includes a configurable construction such that the components of the base can be adjusted according to the amount of horizontal space permitted for deployment of the base or that is needed to support the height or weight of the other shield components or to further adjust the vertical dimension of the sizable vertical positioning element, and thereby the shield. Embodiments of the vertical element base include components and are of a construction that permit the base, and thereby the sizable vertical positioning element to be moved horizontally such that the forward vertical edges of the shielding material supported by the vertical positioning element can be positioned in order to further adjust the horizontal depth of the shielded area.

It is, accordingly, a general object of the present invention to provide apparatus and methods by which the amount of ambient light that may fall onto a viewing surface to be controlled in order to prevent the resultant degradation in clarity of the image displayed on the viewing surface.

An additional object of the present invention is to provide apparatus that include adjustable components by which the amount of ambient light falling onto viewing surfaces of different sizes and configurations may be controlled.

Another object of the present invention is to provide apparatus that include adjustable components by which the amount of ambient light falling onto the area forward from the viewing surface may be controlled to lessen the likelihood that ambient light will fall onto the viewing surface.

Also an object of the present invention is to provide apparatus including lightweight components so that the shield may be transported, assembled, positioned, and disassembled easily and without great cost or effort.

A further object of the present invention is to provide apparatus including components that are of a simplified construction so that the shield may be assembled and disassembled quickly and by even one with limited experience or training.

An added object of the present invention is to provide apparatus including flexible components such that the area darkened by the shield can be horizontally and vertically adjusted.

These and other objects, features, and advantages of the invention will be clearly understood from and explained with reference to the accompanying drawings and through a consideration of the preferred embodiments.

DESCRIPTION OF THE DRAWINGS

FIG. 3D shows a partially exploded perspective view of another embodiment of the sizable horizontal positioning element;

FIG. 3E shows a perspective view of the partial connection of the elements of the embodiment of the sizable horizontal positioning element shown in FIG. 3D;

FIG. 3F shows the inner structure of an embodiment of the horizontal positioning elements;

DESCRIPTION OF THE PREFERRED EMBODIMENTS

Figure 1:
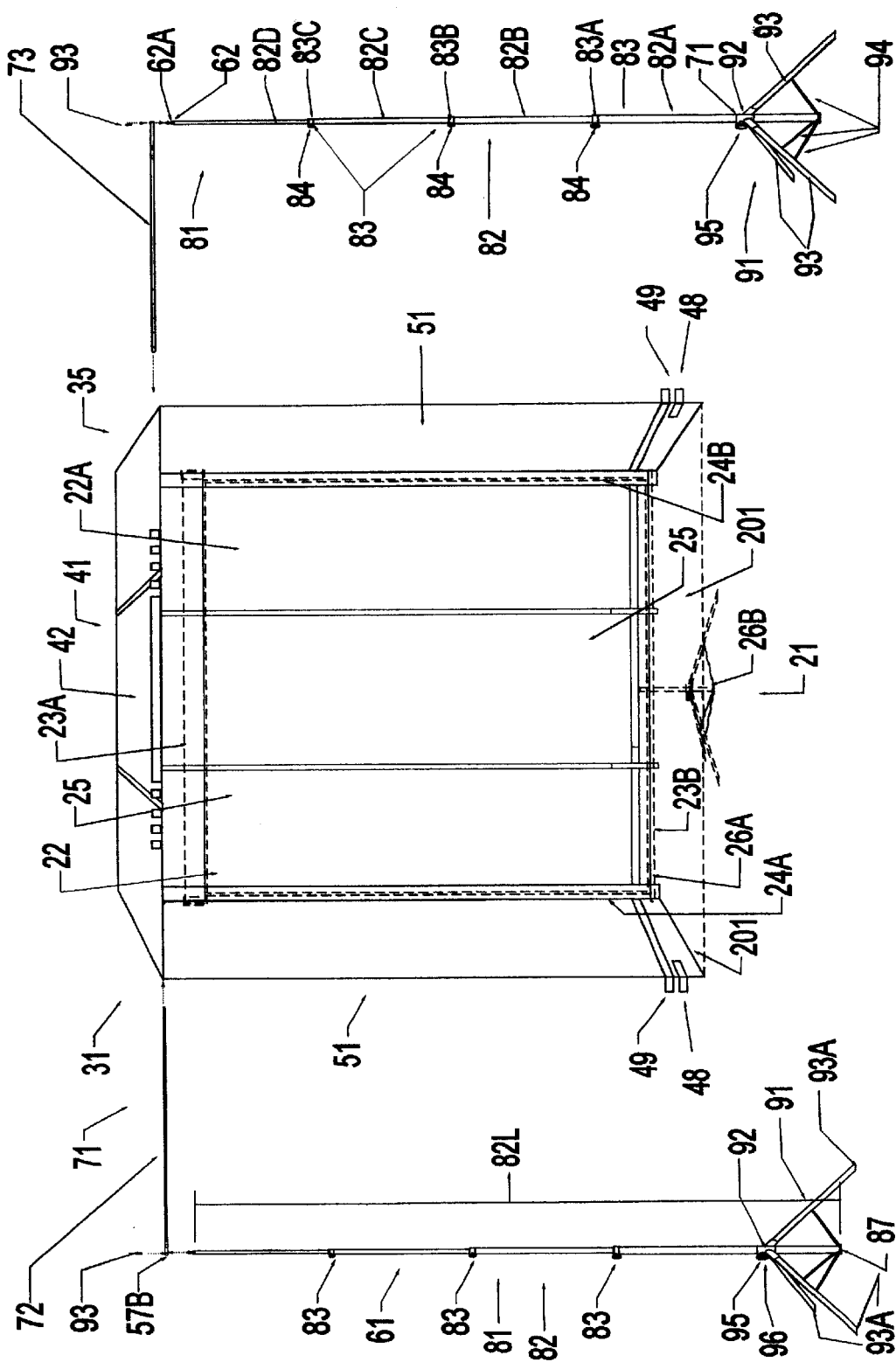
FIG. 1 shows a partially exploded view of an embodiment of the image maintenance shield according to the present invention.

A shield—by which ambient light can be largely prevented from falling onto or around different sized and positioned screens 21 thereby lessening the alteration or degradation of images displayed on it—is designated in the accompanying Figures as 31. The screen 21 may be the surface of a structure, such as a generally fixed wall or a generally movable device, onto which an image is projected. An example of such a screen 21 is a conventional projector screen as shown in FIG. 1 (in phantom) onto which images are projected or "thrown" from a slide or computer projector (not illustrated). The screen 21 may be also be a structure having a surface through which an image is projected such as a television set or computer monitor as shown in FIG. 6B (in phantom). In order that the shield 31 may be used with a wide variety of different sized and positioned screens 21, shield 31 is configurable.

Figure 1A:
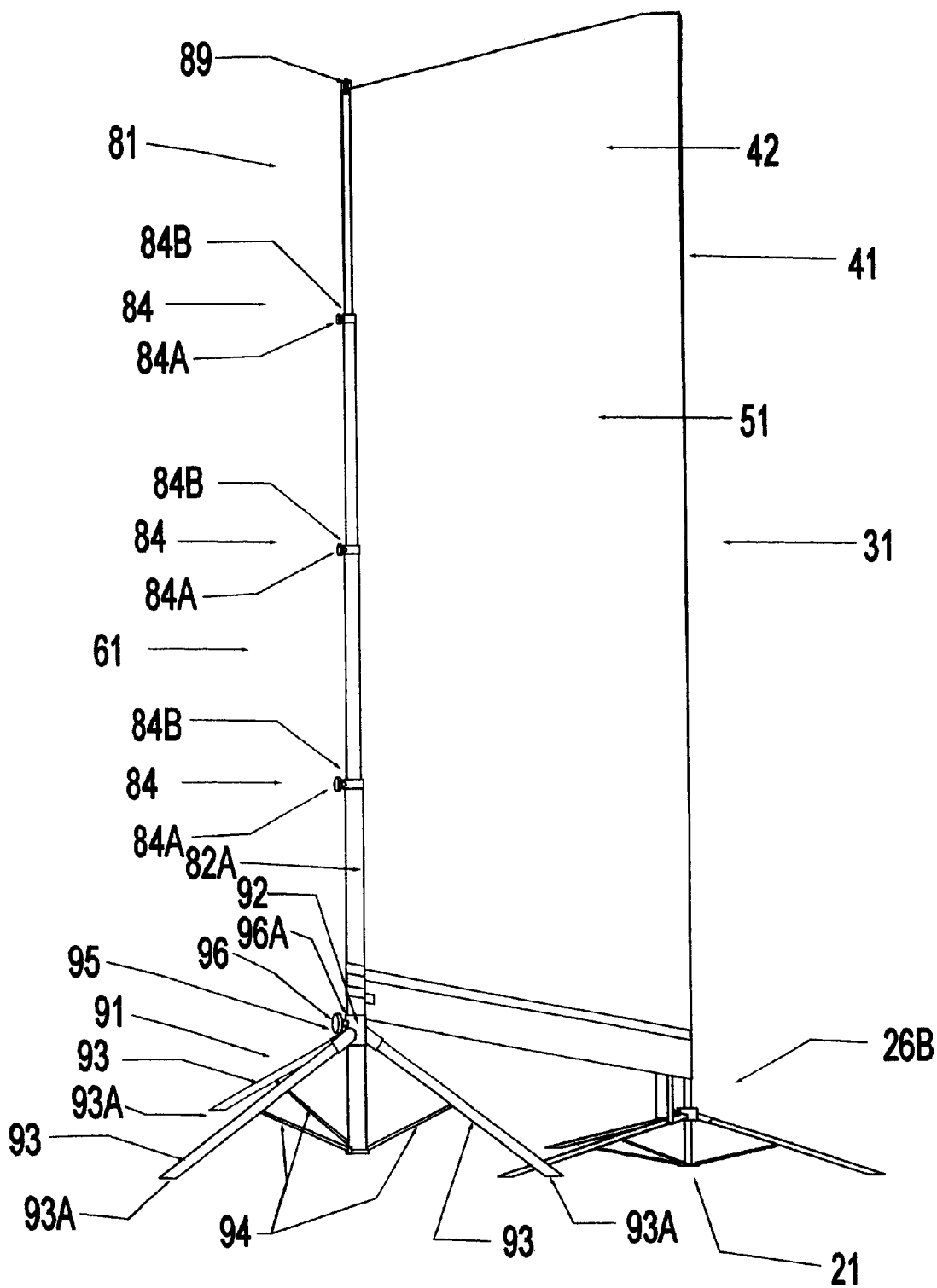
FIG. 1A shows a side view of an embodiment of the shield.
Figure 5:
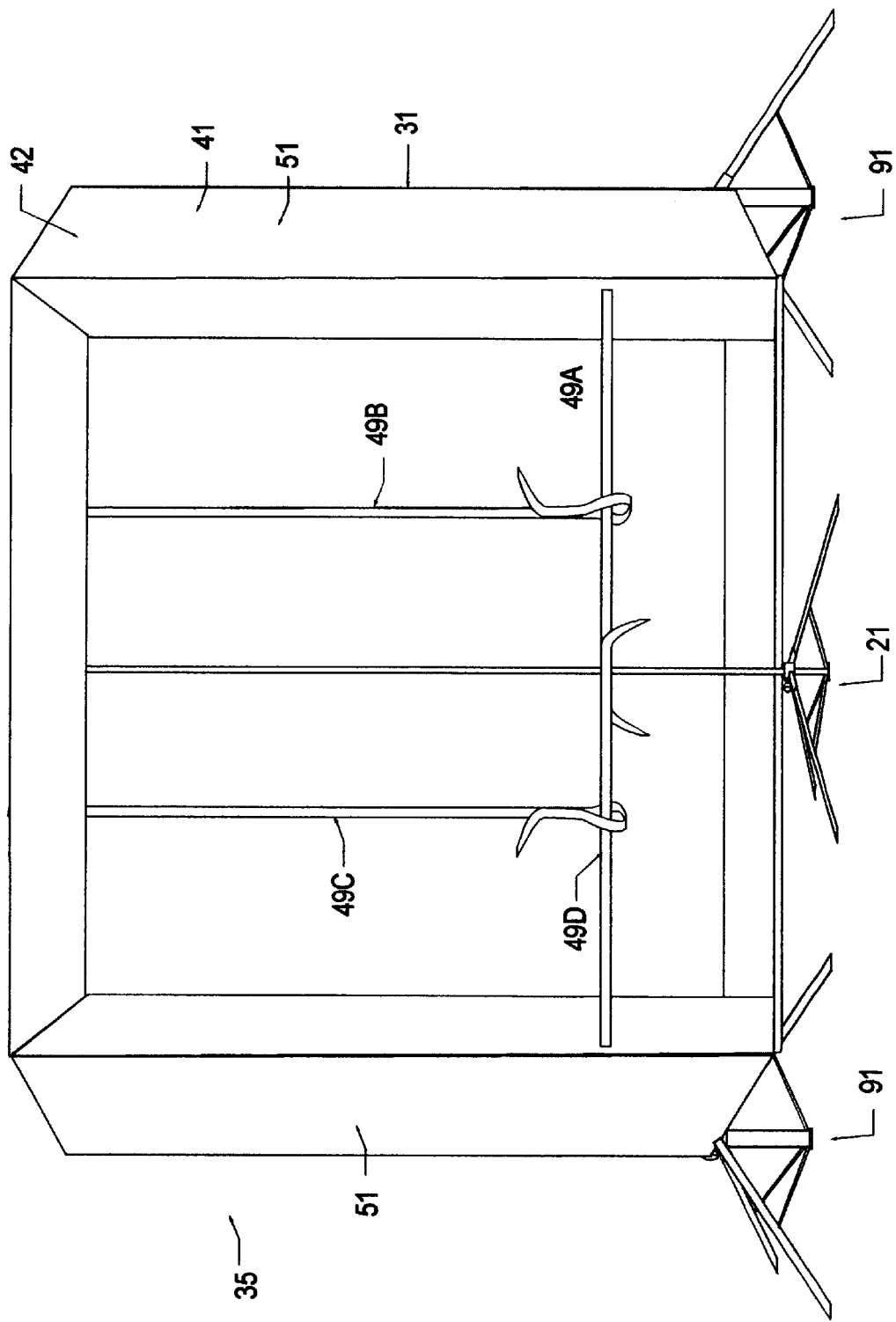
FIG. 5 shows a rear view of an embodiment of the present invention.

One preferred embodiment of shield 31 that is particularly useful with respect to a generally movable screen 21—such as the one illustrated in FIG. 1 (in phantom)—is shown in FIG. 1 (from the front), in FIG. 1A (partially from the side), and in FIG. 5 (from the rear). The illustrated screen 21 is a conventional one typically used to receive images projected or thrown such as from a slide or computer projector and includes flexible screen material 22—supported in part by screen support 26A and base 26B—and having an upper edge 23A and lower edge 23B and opposing side borders 24A, 24B that define a viewing surface 25. Embodiments of such a conventional screen 21 typically includes a roller (not shown completely) from which the flexible screen material 22 may be drawn from by the application of pulling pressure such as on a handle (not illustrated) and into which the flexible material 22 may be drawn back when released.

The shield 31 usable with respect to the generally movable screen 21 illustrated in FIGS. 1, 1A, and 5 includes configurable shielding components 35.

The configurable shielding components 35 include a shielding element 41 and a sizable configuring element 61. The shielding element 41 will be discussed first.

Shielding element 41 preferably includes generally pliable shielding material 42 that is generally opaque to light. The pliable shielding material 42 illustrated in FIGS. 1, 1A, 2, 2A, 5, 6A, and 6B is of a composition and structure such that the material may generally drape when hung. Such material 42 includes that which is made from paper, plastic, foil, a blend or layers of paper, plastic, and/or foil, and cloth—including that made from natural fibers or polyesters—and which may be coated or layered to decrease the likelihood that any light could be transmitted through or reflected off the cloth and/or to prevent the spread of fire. Such material 42 may be generally lightweight and inexpensive—thereby allowing the material to be discarded after a single or few uses such as after a convention or show—or of a more heavy weight and durable—thereby allowing the material to be reused. Pliable shielding material 42 advantageously allows the shield 31 when assembled to be generally adjusted, and thereby configured to facilitate the use of the shield adjacent to or in contact with screens 21 of different sizes and configurations and positions. Pliable shielding material 42 further advantageously allows the shielding material to be adjusted in overall size such that areas of varying horizontal depth and vertical height may be shielded, and thereby darkened. A shielded area 201 of appreciable depth relative to the viewing surface 25 may be necessary in those applications in which the ambient light is bright and the flooring or floor covering reflects some of the light. A shielded area 201 having less depth may be necessary, for example, if those that are viewing the surface 25 are not positioned directly in front of the surface 25, but possibly at an angle to this perpendicular and an area 201 having great depth may obstruct the view that some have of the surface 25. For example, in those situations in which the screen 21is for viewing by the seated public, and the seats are generally perpendicular and in front of the viewing surface 25, the shielded area 201 may be of a greater depth than if the seats are also positioned to the side of the screen surface 25 in which case the pliable screening material 42 may be adjusted to create a side panel or panels 51 having less width. A shielded area 201 having less depth may be necessary, for example, also if a series of horizontally-spaced projectors are being used to throw an image onto the viewing surface 25 and a shielded area 201 of appreciable depth may prevent some or all of the thrown image from reaching the viewing surface 25. An additional advantage of pliable shielding material 42 is that it may be folded, rolled, or compressed into a compact state for ease in transporting the material with other shield components 35 and quickly opened in order to assemble the shield 31.

The sizable configuring element 61 provides additional structure and support to the shielding element 41, and in particular the pliable shielding material42 and allows it, and thereby the shield 31 to be positioned in a wide variety of configurations as needed in order to block ambient light from falling onto the viewing surface.

One preferred embodiment of the sizable configuring element 61 includes a sizable horizontal positioning element 71 and sizable vertical positioning elements 81. Preferably, the sizable horizontal positioning element 71and the sizable vertical positioning elements 81 are of a durable, yet light weight construction such that the elements 71, 81 can be easily transported, easily assembled with the other components of the shield and adjusted so that the shield 31 even when fully assembled can be moved and thereby configured as needed. An example of such a preferred embodiment is shown in FIGS. 1, 1A, and 5.

FIGS. 3A–F illustrate a preferred embodiment of a sizable horizontal positioning element 71 usable in the FIGS. 1, 1A, and 5 embodiment of the sizable configuring element 61.

Figure 3A:
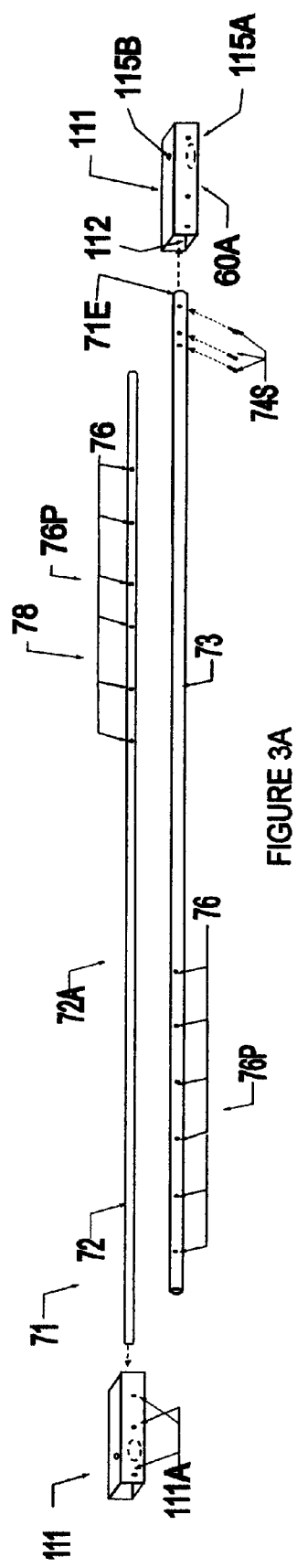
FIG. 3A shows a partially exploded perspective view of an embodiment of the sizable horizontal positioning element.
Figure 3C:
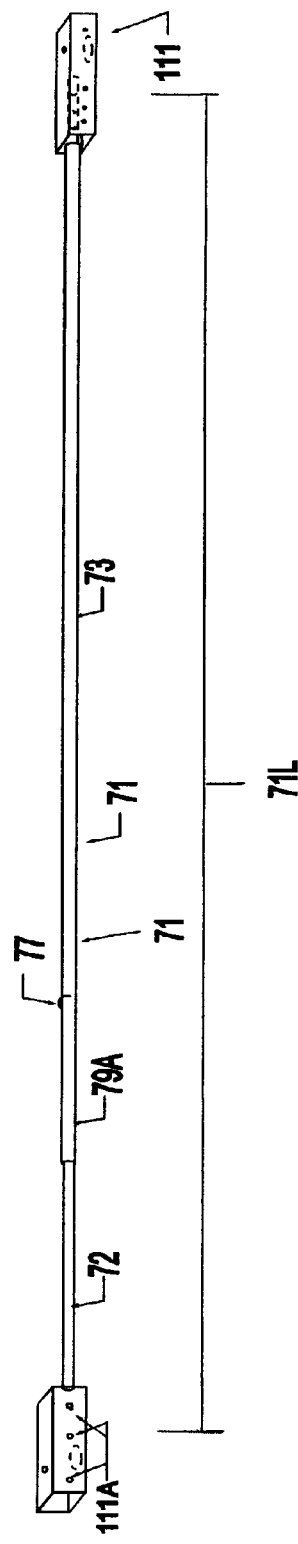
FIG. 3C shows a perspective view of the embodiment of the sizable horizontal positioning element shown in FIG. 3A and FIG. 3B.
Figure 3B:
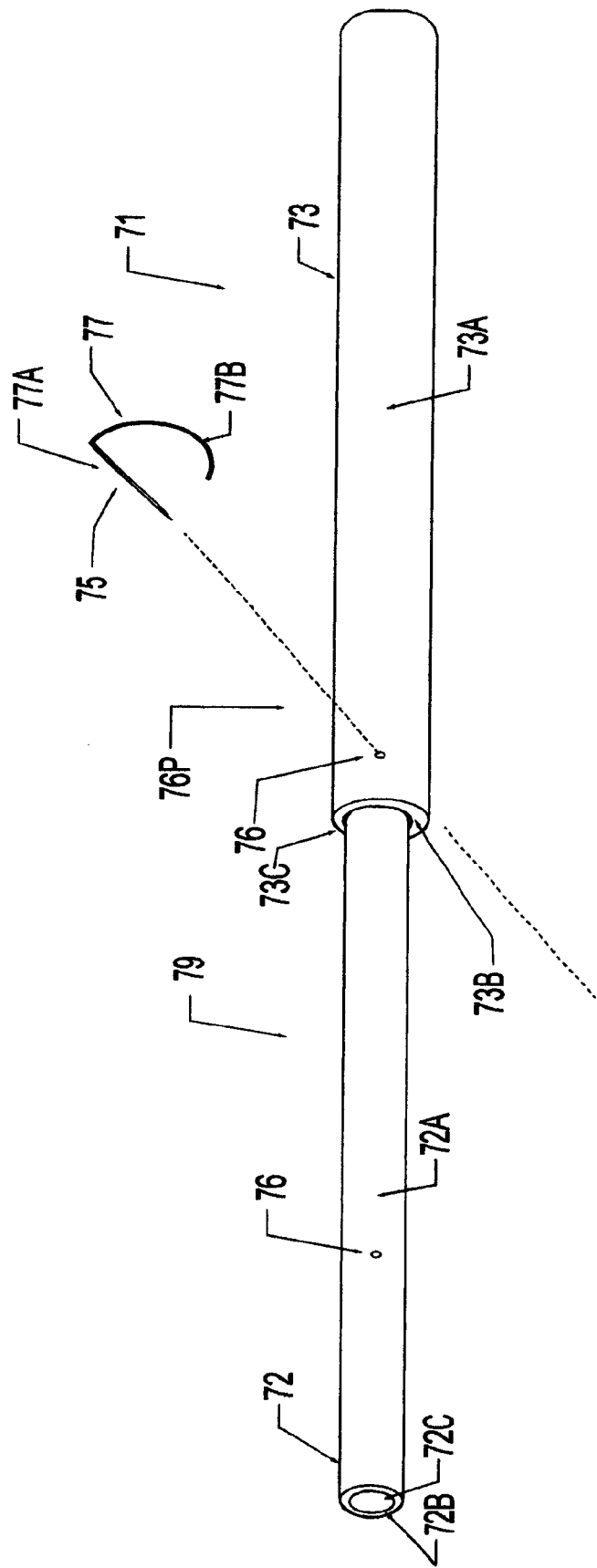
FIG. 3B shows a perspective cutaway view of a portion of the embodiment of the sizable horizontal positioning element shown in FIG. 3A with a clip fastener positioned for insertion.

The illustrated embodiment of the sizable horizontal positioning element 71 permits the pliable shielding material 42, and thereby the shield 31 to be configured in selected positions. This preferred embodiment includes a first lintel element 72 and a second lintel element 73 each of which is alignable along a common axis and joinable to form a lintel length 71L. The illustrated first lintel element 72 has an external surface 72A and the second lintel element 73 has an internal surface 73B having dimensions that define a core 73C and such that the first lintel element 72 may be slid into and out from the second lintel element 73. The illustrated sizable horizontal positioning element 71 may include an adjustable fastener 75 by which the lintel elements 72, 73 may be releasably fixed relative to each other in one or more selected positions to form one or more selected lintel lengths 79. The adjustable fastener 75 illustrated in FIGS. 3A–3C includes a plurality of lintel fastening apertures 76 through which one or more clip fasteners 77 may be inserted. The apertures 76 open completely through each of the lintel elements 72, 73 in a coordinatable pattern 76P so that the apertures in one lintel element can be matched up with the apertures in the other lintel element such that the aperture 76 in one lintel element opens directly onto the aperture 76 in the other lintel element. The clip fastener 77 and the apertures 76 are each of a size and shape such that the clip fastener can be received in one of the coordinated set 76P of apertures 76 such that, with the clip fastener 77 positioned through an aperture 76 in the second lintel element 73 and an aperture 76 in the first lintel element 72, a horizontal positioning element 71 of a selected lintel length 71L with a lintel external surface 71A can be easily configured. The embodiment of the clip fastener 77 illustrated in FIG. 3B include a generally straight clip length 77A and a shaped length 77B. The straight clip length 77A preferably being sized and shaped to be received through a coordinated set 78 of apertures 76 such that the lintel elements 72, 73 are generally releasably fixed in position and can not slide relative to each other. Preferably, the shaped length 776 is sized and shaped and of a composition to engage the external surface 73A of the second lintel element such that the straight clip length 77A may not readily become dislodged from the apertures 76 through which it is inserted. Such a shaped length 77B is illustrated in FIG. 3B in which the curve of the length 77B is similar to the curve of the lintel element surface 73A so that the length 77B engages the surface 73A thereby preventing the fastener 77 from becoming dislodged from the lintel elements 72, 73. Such a clip fastener 77 may be made from a flexible resilient material such as spring steel or similar material. This preferred embodiment of the clip fastener 77 is advantageous in that the fastener 77 as inserted into the lintel elements 72,73 does not greatly increase the profile or weight of the selected lintel length 79.

FIGS. 3D, 3E, and 3F illustrate another preferred embodiment of a sizable horizontal positioning element 71 having a construction and a composition such that the pliable shielding material 42, and thereby the shield 31 may be configured in selected positions. This preferred embodiment includes a first lintel element 72 and a second lintel element 73 each of which is alignable along a common axis. As shown in FIG. 3F, the illustrated first lintel element 72 has an external surface 72A and an internal surface 72B, the internal surface having dimensions that define a first lintel element core 72C. The second lintel element 73 has an external surface 73A and an internal surface 73B having dimensions that define a core 73C. The cores 72C and 73C of this embodiment are of generally the same size and shape and threaded. The FIGS. 3D–3F embodiment of the sizable horizontal positioning element 71 includes a threaded horizontal connecting element 78 having a threaded surface 78A that is dimensioned such that the connecting element 78 may be inserted into both cores 72C and 73C, and thereby joining elements 72, 73 to form a horizontal positioning element 71 having a total length 71L that is variable but as a maximum is slightly less than the total of the individual lengths 72L, 73L, and 78L of each of the individual elements 72, 73, and 78. In those embodiments of the lintel elements 72, 73 that include external surfaces 72A, 73A, respectively, that are configured and dimensioned alike, the connecting element 78 as fully inserted into the lintel elements 72, 73 provides a horizontal positioning element 71 that has a lintel external surface 71A that appears uniformly configured and dimensioned. Advantageously, the shielding material 42 held in place by such a horizontal positioning element 71 may thereby appear to be similarly uniform in this area of the image shield 31. A horizontal positioning element 71 that is formed from and separable into individual elements 72, 73, 78 is generally easy to pack and transport given the smaller size and lower weight of each element 72, 73, and 78. The generally large size of the connecting element 78—relative to the size of conventional fasteners or connectors—makes it less likely that this element may be lost during the assembly, disassembly, or transport process.

The embodiments of the shield 31 illustrated in FIGS. 1, 1A, and 5 includes a sizable configuring element 61 having separate sizable vertical positioning elements 81. Each of the elements 81 in these illustrated embodiments include a shaft 82. While the shaft 82 may be of generally fixed length, the embodiment of the elements 81 illustrated in the FIGS. 1, 1A, and 5 includes cooperating slidable shaft elements 82B–82D that, because of the gradually reduced exterior dimensions of each, may telescope out and back relative to each other and the exterior shaft element 82A such that the overall length 82L of the shaft is variable. In order to enhance the configurability of the shield 31, this embodiment of the element 81 includes one or more controls 83—by which the position of each of the slidable shaft elements 82B–82D may be releasably fixed in position relative to the position of each other and the exterior shaft element 82A and then released for further vertical adjustment or movement such as for disassembly and transport of the shield 31. The embodiment of the separate sizable vertical positioning elements 81 illustrated in FIGS. 1, 1A, and 5 include individual controls 83A–83C at the position at which each shaft element 82B–82D slides out and in relative to each other. To releasably fix the position of each of the slidable shaft elements 82B–82D relative to the position of each other and the fixed shaft element 82A and then released for further vertical adjustment or movement, the illustrated embodiment of the controls 83 include a lock 84. In the illustrated embodiment of the individual controls 83A–83C, the lock 84 includes a head 84A by which a threaded shaft 84B may be manually turned into and out of an aperture (not shown) extending through the fixed shaft element 82A or from a slidable shaft elements 82B–82C to the slidable shaft element below. Advantageously, such controls 83 allow the extent to which each of the nested slidable elements 82B–82D may be drawn from and held in place as needed and so that the shield 31 may be easily and rapidly configured. The embodiment of the sizable vertical positioning element 81 illustrated in FIG. 7A includes a shaft 82 having a generally fixed shaft element 82A out from and into which a shaft element 82B may telescope and a control 83 by which the position of the slidable shaft elements 82B may be releasably fixed in position relative to the position of the fixed shaft element 82A and then released for further vertical adjustment or movement such as for disassembly and transport of the shield 31. The control 83 in the illustrated embodiment may be locked and unlocked by manual turning the control 83. Sizable vertical positioning elements 81 whose size can be adjusted advantageously allow the shield to be configured as needed.

Each of the illustrated embodiments of the sizable vertical positioning elements 81 that are supported on a floor or other generally horizontal surface may include a base 91 to provide added stability to the elements 81, and thereby the shield 31 and to facilitate further configuration of the shield 31. The base 91 may be further structured so that the dimensions of the base 91 and/or the vertical height of each of the elements 81, and thereby the shield 31 may be further adjustable. The base 91 may include also means by which the base 91 may be quickly connected to and disconnected from the element 81 to facilitate quick and easy assembly the elements 81 and thereby the shield 31.

The embodiment of the base 91 illustrated in FIGS. 1, 1A, and 5 is adjustable in dimension and permits the overall vertical height of an element 81 to be further adjusted. The illustrated base 91 includes a connector 92—having a shaft aperture (not shown) sized and shaped and having a construction to securely receive the shaft 82A arising vertically therethrough. This illustrated embodiment of the base 91 includes individual base extensions 93 extendable radially from the connector 92 such that the base extension ends 93A may be generally equally spaced from each other in order to maximize the stability of the element 81 and thereby the shield 31. Each of the extensions 93 in the FIGS. 1, 1A, and 5 embodiment is supported from the base 91 by extension supports 94 connected to the extensions 93 and to a point approximate to the lower end 87 of the shaft 82A. To releasably fix the positions of the base extensions 93 relative to the shaft 82, the illustrated embodiment of the base 91 includes a base control 95. The base control 95 may be similar to the shaft control 83 discussed above. The control 95 illustrated in FIGS. 1, 1A, and 5 includes a head 96 sized and shaped such that a threaded connector shaft 96A may be manually turned into and out of an aperture (not shown) extending through the connector 92 and to the shaft 82A. This embodiment is particularly advantageous because it can be deployed to adjust the dimensions of the base 91 according to the amount of horizontal space permitted for such deployment and/or required according to the height or weight of the other shield components carried by the sizable vertical positioning elements 81.

Figure 7A:
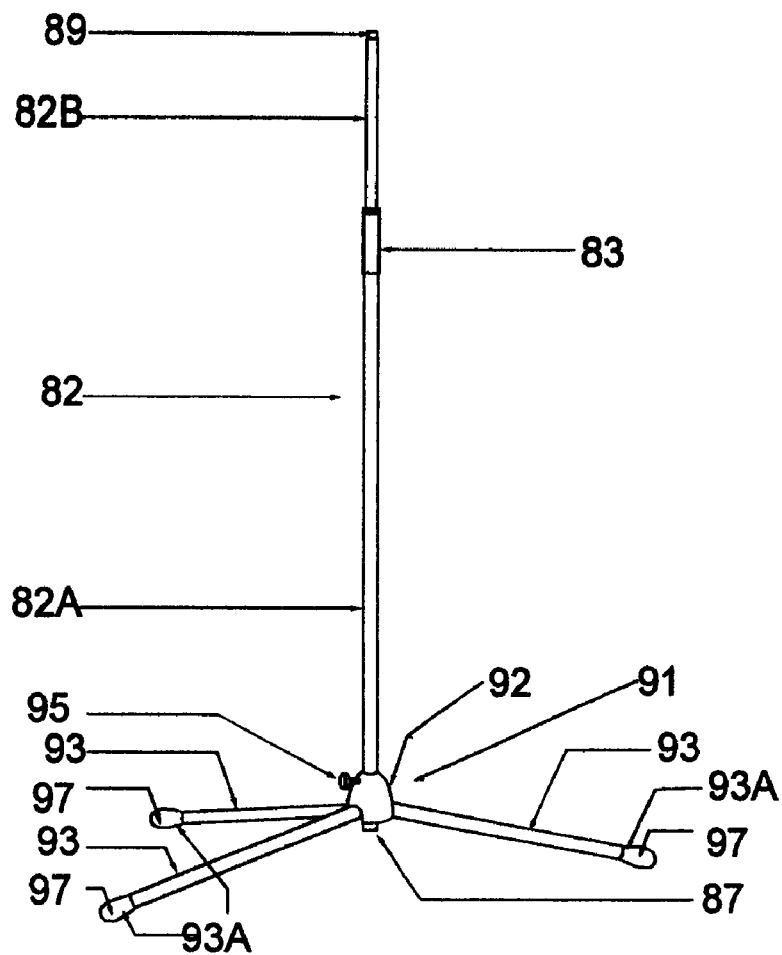
FIG. 7A shows a perspective view of another vertical positioning element.

Another embodiment of a base 91 is illustrated in FIG. 7A and includes individual base extensions 93 joined or joinable to a connector 92 and without extension supports 94 such that the arms extend radially generally from the lower end 87 of the element 81 to further increase the stability of the element 81, and thereby the shield 31. The embodiment of the base 91 illustrated in FIG. 7A includes a connector 92 to which shaft 82 may be secured—such as by receipt of a threaded fastener 93 into an aperture (not shown) opening onto the shaft 82.

The base 91 may include elements that further facilitate the stabilization of the base 91 even if the horizontal surface on which it rests is uneven. For example, the FIGS. 1, 1A, and 5 embodiment of the base 91 includes extensions 93 having base extension ends 93A with flexible tip coverings 97 that are intended to facilitate the stabilization of the base 91 even if the horizontal surface on which it rests is slightly uneven.

Figure 7B:
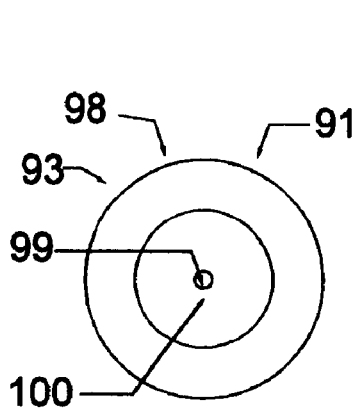
FIG. 7B shows an overhead view of an embodiment of the base of a vertical positioning element.

Additional embodiments of the base 91 include a single extension 93 formed by the extension of the base into a broadened generally continuous surface 98 thereby providing added horizontal support for the base, and thereby added stability to the shield 31. One such embodiment of the base 91 is illustrated in FIG. 7B and includes an extension 93 having a generally continuous surface 98 extending equally from a center 99 at which the shaft 82 may be joined to the base 91.

Figure 7C:
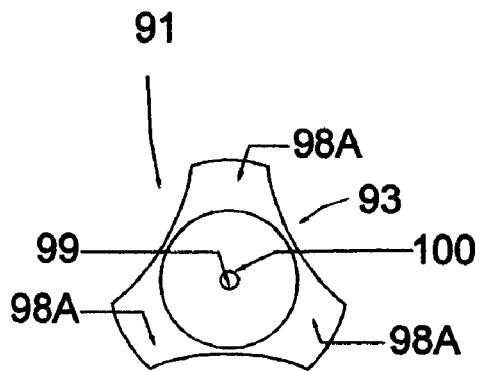
FIG. 7C shows an overhead view of another embodiment of the base of a vertical positioning element.

Another embodiment of the base 91 with a generally continuous surface 98 is illustrated in FIG. 7C structured as broadened arms 98A that extend radially from the center 99 to provide added horizontal support for the base, and thereby added stability to the shield 31. The bases 91 illustrated in FIGS. 7B and 7C may be connectable to the shaft 82 by receipt of one end 87 having threads (not shown) into a threaded aperture 100 (threads not shown) opening at the center 99 of the base 91. Such embodiments of the base 91 are advantageous in that they are of a simplified construction and relatively easy to transport and connect to the shaft 82, and may be of a reduced cost. Such bases 91 may be made from a single shaped element formed, for example, from a resilient material such as metal.

Figure 2:
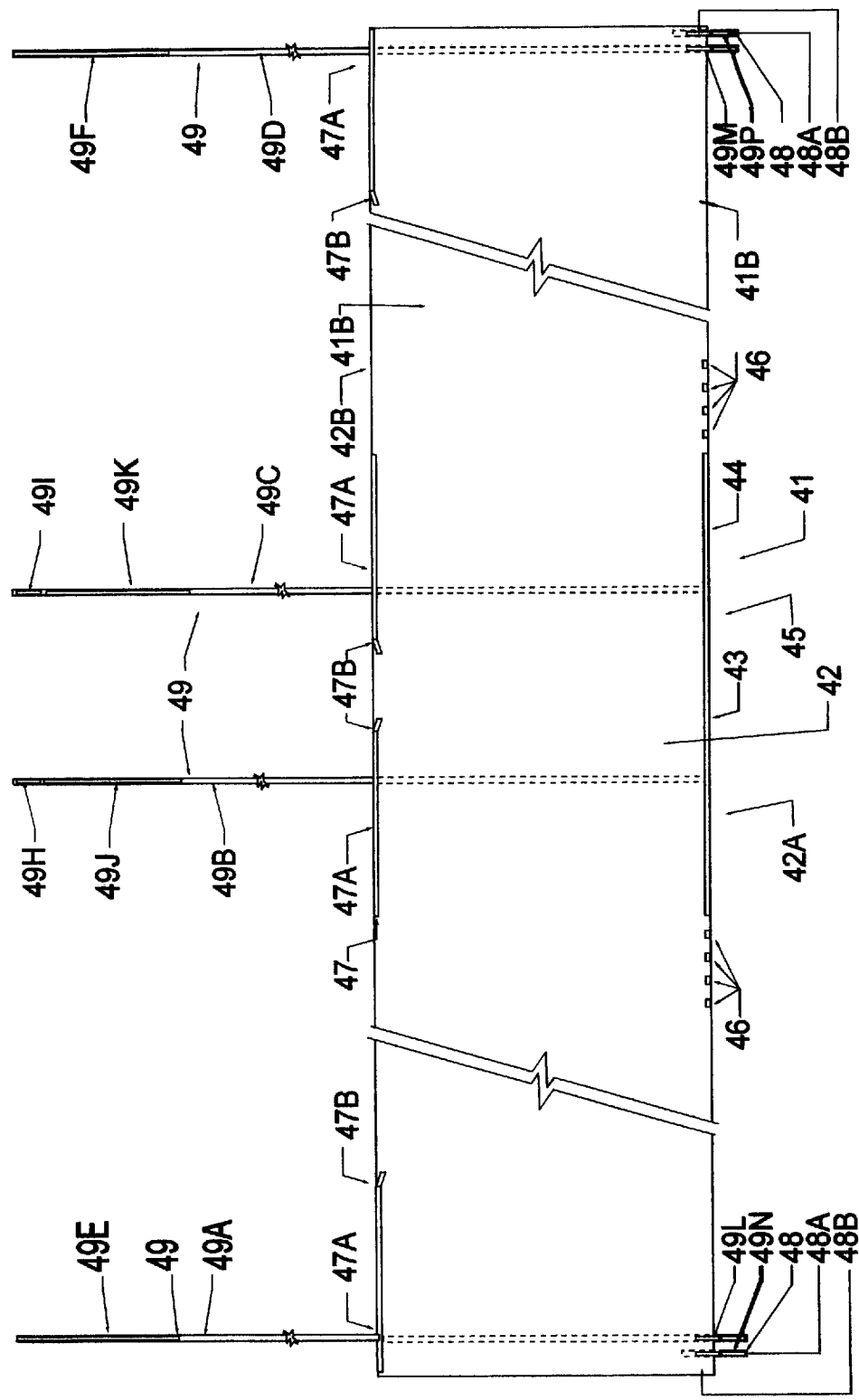
FIG. 2 shows an overhead view of an embodiment of the shielding element.
Figure 2A:
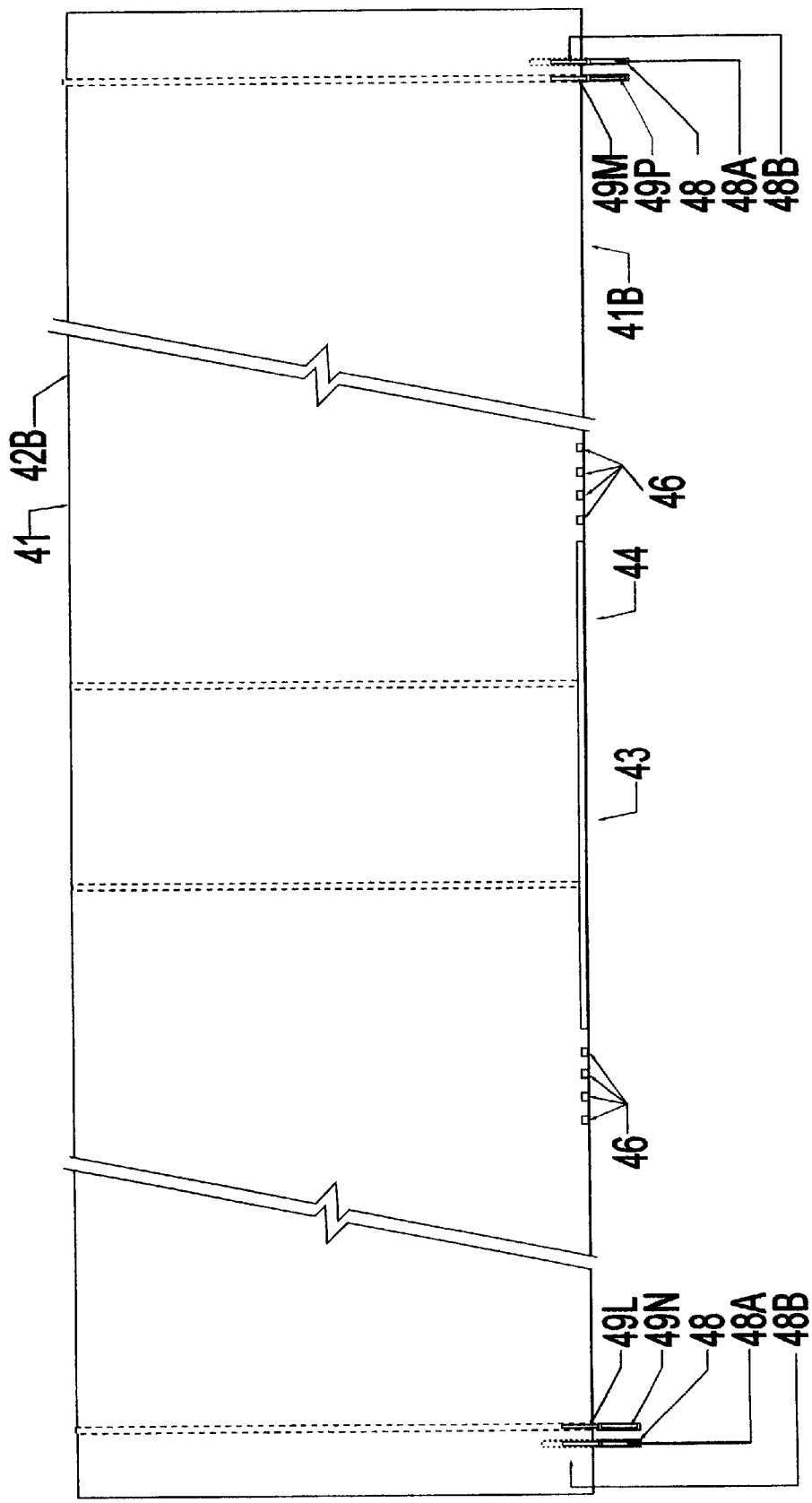
FIG. 2A shows an overhead view of another embodiment of the shielding element.
Figure 2B:
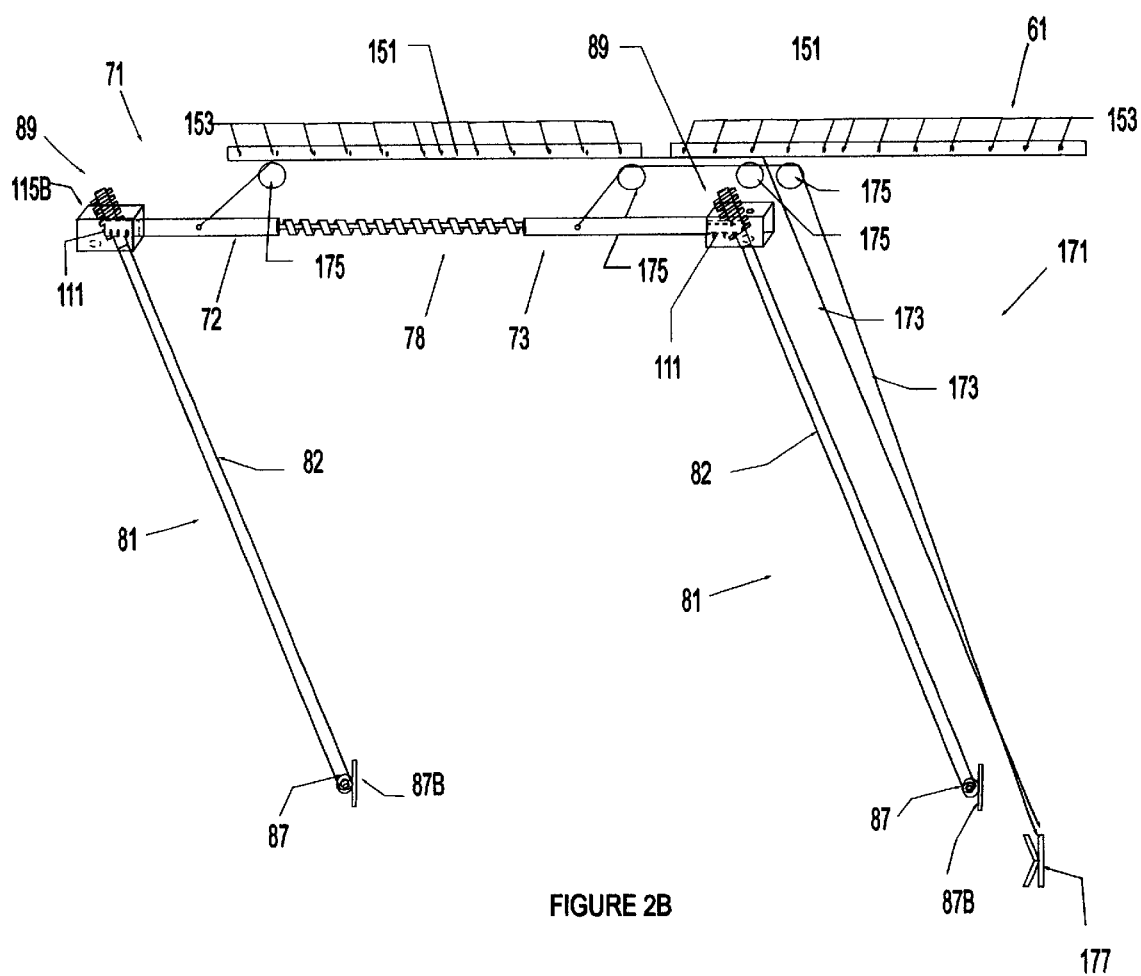
FIG. 2B shows an embodiment of the image maintenance shield including vertical elements that may be mounted to a wall or other separate support.

Another preferred embodiment of the sizable configuring element 61 useful to prevent ambient light from falling such as on a screen 21 that is, for example, positioned adjacent to or mounted on or within a vertical wall is illustrated in FIG. 2B. The FIG. 2B embodiment includes a sizable horizontal positioning element 71 and separate vertical positioning elements 81 that may be supported from a generally vertical surface—such as a wall or partition. The FIG. 2B embodiment is shown as including a sizable horizontal positioning element 71 having a construction as the one shown in FIGS. 3D and 3E but which may have a construction such as the one shown in FIGS. 3A–3F. The vertical positioning elements 81 are of a simplified construction and include a shaft 82 that includes a shaped end 89—such as the illustrated threaded end 89—that is securable to a joining element 111 that connects the horizontal positioning element 71 to each of the vertical positioning elements 81—and a lower end 87—that is securable by a vertical end bracket 87B to the vertical supporting surface such as by the receipt of screws through openings in the bracket and into the vertical surface (not shown). The embodiment includes a shield bracket 151—that is securable to the vertical support surface such as by the receipt of screws or other attachment means such as rivets (not shown) through apertures 153 in the shield bracket 151 and into the vertical support surface—by which the rear edge 42B of the pliable shielding material 42 (not shown in FIG. 2B) may be carried from the vertical support surface. The rear edge 42B of the pliable shielding material 42—such as that embodiment illustrated in FIG. 2A—may be releasably fixed to the vertical support surface by the capture of the rear edge 42B (and parts adjacent thereto) by the shield bracket 151 and/or the means used to attach the bracket to the vertical support surface. Advantageously, the distance at which the horizontal positioning element 71, and therefore the angle at which the vertical positioning elements are carried from the e vertical supporting surface and the degree to ambient light is prevented from falling on a wall mounted or other supported screen is shielded with the FIG. 26 embodiment is adjustable by distance controls 171. FIG. 2B illustrates a sizable configuring element 61 having two such distance controls 171 (the illustrated left one of which is shown summarily but includes the same elements as the illustrated right one.) The distance controls 171 in the FIG. 2B embodiment include one or more lines 173 connected to the horizontal positioning element 71 and threaded through pulleys 175. By pulling on or releasing partially or wholly the line or lines 173, the position of the sizable configuring elements 61 may be changed. The position of the lines 173 may be releasably fixed by securing the line or lines to a line bracket 177 that may be mounted on the vertical supporting surface. Because the FIG. 2B embodiment does not require a base or bases as do the other illustrated embodiments, the embodiment is particularly useful not only to shield a wall mounted screen 21 but also when floor space is limited or must remain open such as to accommodate the movement of people in and around the area in which the embodiment is used.

Figure 6A:
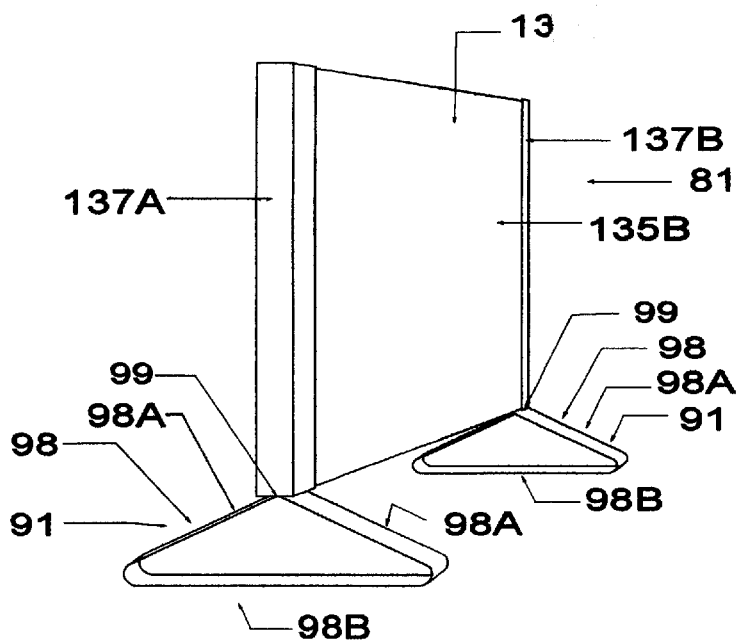
FIG. 6A shows a perspective view of another vertical positioning element.
Figure 6B:
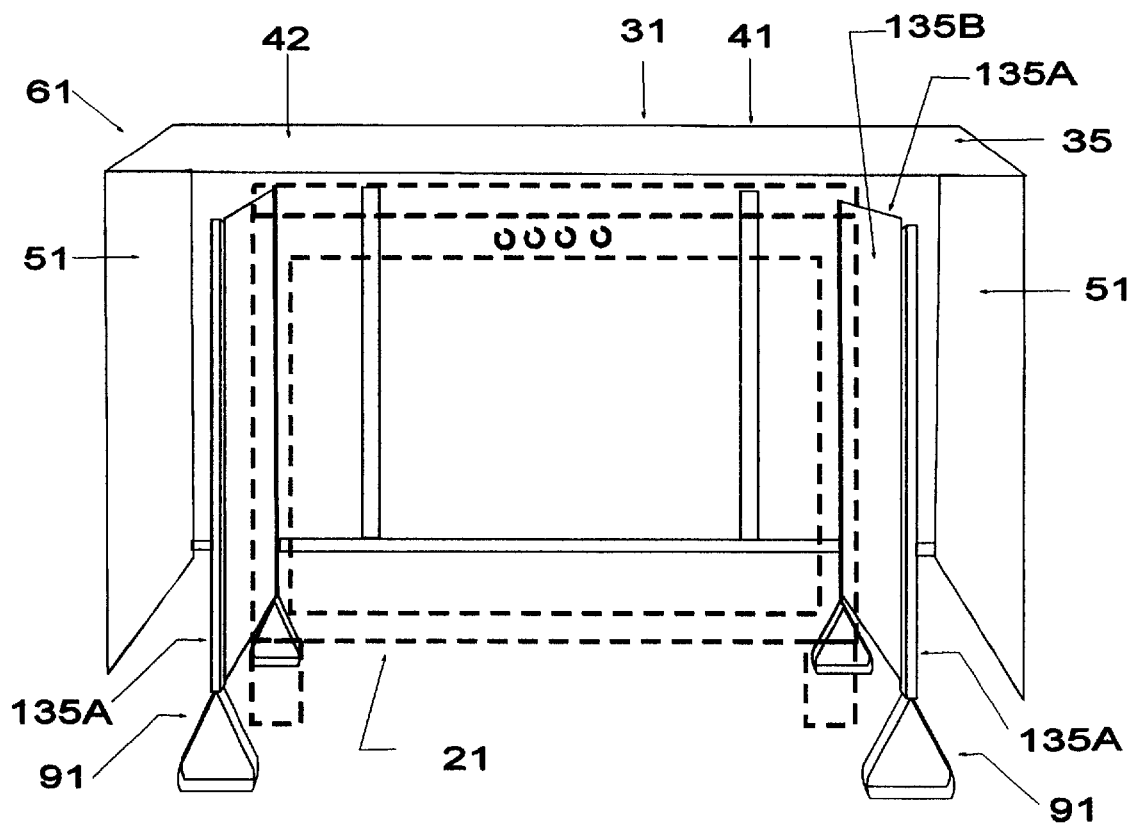
FIG. 6B shows a partially exploded view of an embodiment of the image maintenance shield with the embodiments of the vertical positioning element shown in FIG. 6A each flanking the short side walls of a television or monitor.

An additional preferred embodiment of the sizable configuring element 61 is illustrated in FIGS. 6A and 6B and includes a sizable horizontal positioning element 71 and vertical positioning elements 81. Each element 81 of this embodiment includes two bases 91 above and between which generally nonflexible or flexible material 131 extends vertically to form a generally vertical wall 135 having opposing vertical edges 137A, 137B. Each base of the FIGS. 6A and 6B embodiment includes a generally continuous surface 98 structured in this embodiment as arms 98A—that extend generally equal from a center 99 at which the shaft 82 is joined to the base 91—joined by a generally continuous lower base surface 98B that extends perpendicular to the horizontal faces 135B of the wall 135. FIG. 6B illustrates this embodiment as positionable adjacent to a large screen monitor or television (shown in broken lines) in order to shield it. In such embodiment, the sizable horizontal positioning element 71 includes the upper horizontal edge 135A on whcih the shielding material 42 may rest. For additional horizontal support, the embodiment may include a lintel length as described above.

Figure 4:
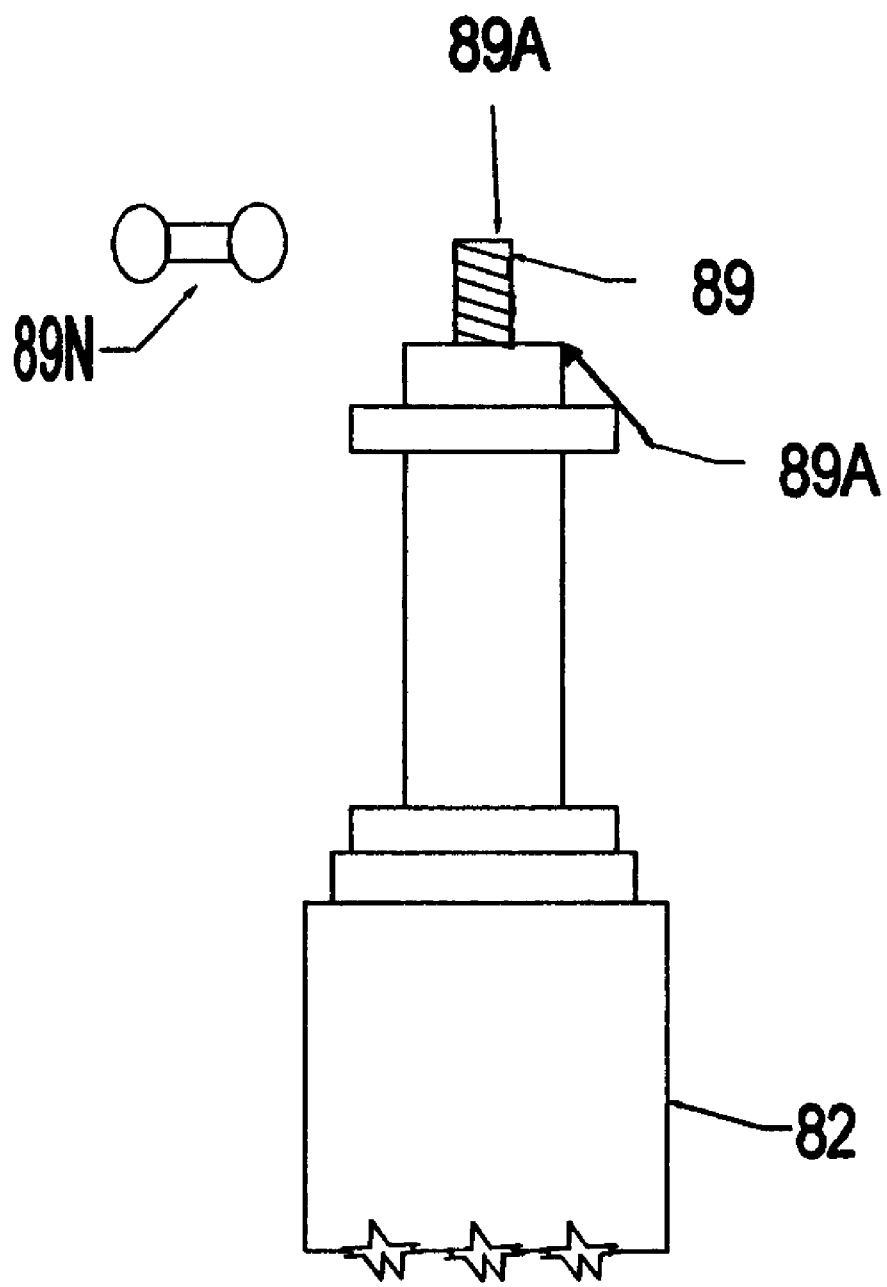
FIG. 4 shows an embodiment of a shaped connector.

The embodiments of the horizontal positioning elements 71 shown in FIGS. 2B and 3A–3F is joinable to the vertical positioning elements 81 shown in FIGS. 1, 1A, 2B, and 7 by joining elements 111. FIGS. 2B, 3A and 3C–3E show one embodiment of such joining element 111. This embodiment of the joining element 111 includes a horizontal receiving aperture 112 sized and shaped such that a lintel end 71E of the horizontal positioning element 71 may be inserted therein. Simply by a cooperating fit of each lintel end 71E of the horizontal positioning element 71 into the aperture 112, the element 71 may be releasably fixed to the joining element 111. The horizontal positioning element 71 may be releasably secured to the joining element 111 by the receipt of screws 74S—or more permanently fixed by the receipt of rivets 74S—through one or more apertures 111A in the joining element 111 and into the joining apertures 74 in the horizontal positioning element 71. The joining element 111 includes one or more vertical receiving apertures 115 by which a vertical positioning element 81 is releasably securable to the joining element 111, and thereby to the horizontal positioning element 71. The vertical receiving apertures 115 of the joining element 111 shown in FIGS. 3A and 3C–3E is sized and shaped to receive the shaped end 89 of the embodiment of the vertical positioning element 81 shown for example in FIGS. 1, 1A, and 7A. The shaped end 89 may be sized and shaped as shown in FIG. 4 so that the end 89 may be inserted into a joining element 111 having a lower vertical receiving aperture 115A and a upper vertical receiving aperture 115B (as partially illustrated in FIG. 2B). Such a shaped upper end 89 is shown in FIG. 4 and includes a ledge 89A—on which the lower surface 111L of the joining element 111 adjacent to aperture 115B may rest after insertion—and a threaded end 89B that may be threaded into the upper vertical receiving aperture 115B. The joining of element 81 to element 111 may be releasably secured by the receipt of a fastener—such as the wing nut 89N shown in FIG. 4—onto the threaded end 89B.

The shielding element 41 includes position maintenance means 43 such that the pliable shielding material 42 may be readily configured by the sizable configuring element 61 and maintained in position to form the selected shield 31. The position maintenance means 43 of the embodiment of the shielding element 41 shown in FIG. 2 includes maintenance elements 44 for configuration of the shielding material 42 by the sizable horizontal positioning element 71 and sizable vertical positioning elements 81 to provide a shield having a structure such as the one shown in FIGS. 1, 1A, and 5. The position maintenance means 43 of the embodiment of the shielding element 41 shown in FIG. 2A includes maintenance elements 44 for configuration of the shielding material 42 by the sizable horizontal positioning element 71 and sizable vertical positioning elements 81 to provide a shield having a structure such as the one shown in FIG. 2B. In the embodiment of the position maintenance means 43 illustrated in FIG. 2, the maintenance elements 44 includes a channel 45 formed on a forward edge 42A of the surface 41B of the shielding material 41 having a construction and size and shape to permit a sizable horizontal positioning element 71—such as the axially-aligned elements 71 illustrated in FIGS. 3C and 3E—to be easily slid into and out of the opening (not shown) formed within the channel 45.

The position maintenance means 43 in the embodiments of the shielding element 41 illustrated in FIGS. 2 and 2A includes one or more loops 46 aligned along the forward edge 42A of the surface 41B. The loops 46 are constructed and sized and shaped to receive the end of, and thereby releasably fix the position of the shielding material 42 relative to each of the sizable vertical positioning elements 81.

The position maintenance means 43 may include weighing elements 47 by which the pliable shielding material 42 may be maintained in the selected position even if the shield 31 is used in a windy environment such as an outdoor venue. The weighting elements 47 may include dense material layered on or in the pliable shielding material 41. In the embodiment of the shield 31 illustrated in FIG. 2, the weighing elements 47 include pockets 47A on a surface 41B of and aligned toward a rearward edge 42B of the shielding material 41 in which dense material (not shown) may be inserted as needed and retained within the pocket 47A— such as with velcro closures or other reusable closure means—or permanently fixed. The weighting elements 47 may include a closure 47B by which the pocket 47A may be releasably fixed.

The position maintenance means 43 may include securing elements 48 by which the pliable shielding material 42 may be further held in a position relative to the viewing surface 25. In the embodiments of the shield 41 illustrated in FIGS. 2 and 5, the securing elements 48 include straps 49 that are constructed and sized and shaped and spaced to extend beyond the edges 42A, 42B to hold the pliable shielding material 42 in a position relative to the movable screen 21. Specifically, the straps 49 in the shield embodiment illustrated in FIGS. 2 and 5 include a longer set of straps 49A, 49B, 49C, and 49D—that may generally extend from a rearward edge 42B of the shielding material 41 and looped around each other and secured by the velcro elements 49E, 49F, 49J, 49H, 49K, and 49I or similar releasable strap securing means—and a relatively shorter set of straps 49L, 49M, 49N, and 49P—that may generally extend from a forward edge 42A of the shielding material 21 and looped around the sizable vertical positioning elements 81 and secured by the means discussed above such as velcro elements 48A, 48B.

The position maintenance means 43 in the embodiment of the shielding material 42 illustrated in FIG. 2A includes securing elements 48 by which the rear edge 42B of the pliable shielding material 42 (not shown in FIG. 2B) may be carried from the vertical support surface shield bracket 151 and the shielding material 41 is positionable generally adjacent to or in contact with the viewing surface 25.

It will be understood that the embodiments of the present invention which have been described are illustrative of some of the applications of the principles of the present invention. Numerous modifications may be made by those skilled in the art without departing from the true spirit and scope of the invention.

We claim:

1. A configurable shield for preventing ambient light from falling onto, and thereby causing degradation of images displayed on a screen, said screen including opposing boundaries, said shield comprising:

a shielding element including pliable shielding material that is generally opaque to the ambient light;

a sizable configuring element for providing support and structure to said shielding element and permitting said shielding element to be variously positioned and configured adjacent to the screen boundaries, said sizable configuring element includes a sizable horizontal positioning element and sizable vertical positioning elements;

said sizable horizontal positioning element includes a first lintel element and a second lintel element joinable to form a lintel length sized and shaped to horizontally support and structure said shielding element;

said vertical positioning elements include separate shafts joinable to said sizable horizontal positioning element by receipt of a shaped end of each of said separate shafts within a joining element connected to lintel ends of said horizontal positioning element.

2. The shield according to claim 1, wherein vertical positioning elements each include a base.

3. The shield according to claim 2, wherein said base includes individual base extensions extendable radially from a connector.

* * * * *